(12) United States Patent
Scheier et al.

(10) Patent No.: US 7,512,289 B2
(45) Date of Patent: Mar. 31, 2009

(54) APPARATUS AND METHOD FOR EXAMINATION OF IMAGES

(76) Inventors: Christian Scheier, Alstertwiete 30, Hamburg (DE) 20099; Steffen Egner, Alstertwiete 30, Hamburg (DE) 20099

( * ) Notice: Subject to any disclaimer, the term of this patent is extended or adjusted under 35 U.S.C. 154(b) by 802 days.

(21) Appl. No.: 10/716,879

(22) Filed: Nov. 20, 2003

(65) Prior Publication Data

US 2004/0151403 A1 Aug. 5, 2004

Related U.S. Application Data

(60) Provisional application No. 60/427,574, filed on Nov. 20, 2002.

(51) Int. Cl.
*G06K 9/54* (2006.01)
(52) U.S. Cl. ..................................... 382/305
(58) Field of Classification Search ........................ None
See application file for complete search history.

(56) References Cited

U.S. PATENT DOCUMENTS

| | | | | |
|---|---|---|---|---|
| 5,437,014 A | * | 7/1995 | Busboom et al. | 715/759 |
| 5,453,762 A | * | 9/1995 | Ito et al. | 345/179 |
| 5,483,960 A | * | 1/1996 | Steiger et al. | 600/425 |
| 6,879,709 B2 | * | 4/2005 | Tian et al. | 382/118 |
| 7,076,087 B2 | * | 7/2006 | Wakiyama | 382/117 |
| 2002/0140542 A1 | * | 10/2002 | Prokoski et al. | 340/5.52 |

* cited by examiner

*Primary Examiner*—Matthew C. Bella
*Assistant Examiner*—Alex Liew
(74) *Attorney, Agent, or Firm*—Morrison & Foerster LLP

(57) ABSTRACT

The invention relates to an apparatus for examination of images having an image storage device which is designed to store image data for images to be evaluated, a display device which is designed to display the image data, an input device for a subject that is designed to interrogate visualization data, a control device which connects the abovementioned devices to one another, a data matching device for matching image data and visualization data, and an evaluation device for calculation of a visualization profile, with the visualization data comprising position data which is transmitted from the input device. The input device may have a pointing appliance designed such that it is moved manually by the subject for pointing, and the input device interacting interactively with the marking such that the position of the pointing appliance is displayed by means of the marking on the display device. This allows simple and fast recording of the areas which are particularly observed by subjects. The invention also relates to a corresponding method for examination of images.

16 Claims, 9 Drawing Sheets

APPARATUS AND METHOD FOR EXAMINATION OF IMAGES

FIELD AND BACKGROUND OF THE INVENTION

The invention relates to an apparatus for examination of images using an image storage device which is designed to store image data for one or more images to be evaluated, a display device which is designed to display the image data, an input device for a subject, which is designed to interrogate visualization data, a control device which connects the abovementioned devices to one another, a data integration device for matching image data and visualization data, as well as an evaluation device for calculation of a visualization profile, with the visualization data comprising position data which is transmitted from the input device. The invention also relates to a method for examination of images, having the steps of storage of image data for one or more images to be examined, in a memory device, display of the image, determination of positions of a moving pointing device and production of visualization data from the positions, matching the image data and visualization data, and calculation of a visualization profile.

In the field of media, in particular advertising, it is important to know how image material is perceived by subjects, and what effect it has on the viewer. Knowledge such as this allows strength and weaknesses of the image material to be identified. This is primarily used to optimize the effect of the image material, and to avoid errors. It is known from obvious prior use for the image material to be assessed to be placed in front of a specific group of subjects, and for them subsequently to be asked about it. This is frequently done using questionnaires which the subjects have to answer once they have seen the image material to be assessed. This known method is complex and inconvenient. Furthermore, the quality of the results is frequently less than would be desired since, for practical reasons, the questionnaire cannot be answered until the image material has been shown. The subjects therefore provide their response only retrospectively. Spontaneous impressions and sensations are thus frequently not reflected correctly. A further disadvantage is that the responses are only indirect. This is because the subject must first of all convert his visual impressions to verbal form, before he can answer the questions that have been asked. Many emotionally deep impressions are, however, difficult to express in words, particularly if the subject is not well practiced in speaking. Furthermore, inaccuracies which result from this can lead to considerable distortion in the result. Direct methods have been developed in order to avoid this disadvantage. In this context, the expression direct methods means that the subject no longer needs to convert his visual impressions to a verbal form. Instead of this, his reaction is measured directly. Since it is impossible to directly measure human thought processes, an auxiliary parameter is used. It is known from obvious prior use for eye movements to be recorded and for them to be used to draw a conclusion as to what areas of the image material are being looked at in particular. Apparatuses which are provided with a camera for measurement of eye movements are known from obvious prior use. Generally, the camera for this purpose is arranged on a head mounting frame, which is fitted to the subject. This achieves a direct result as in the case of questioning. In particular, it is possible to determine spontaneous reactions and, in particular, even unconscious reactions. One serious disadvantage, however, is that the equipment which is required for measurement of eye movement is highly specific. Purchasing and operation therefore demand a major outlay. Such assessments of image material can thus generally be carried out only by specialized facilities.

SUMMARY OF THE INVENTION

The invention is based on the object of reducing this outlay and of widening the applicability.

According to the invention, in the case of an apparatus for examination of images having an image storage device which is designed to store image data for one or more images to be evaluated, having a display device which is designed to display the image data, having an input device for a subject, which is designed to interrogate visualization data, having a control device which connects the abovementioned devices to one another, having a data integration device for matching image data and visualization data, and having an evaluation device for calculation of a visualization profile, with the visualization data comprising position data which is transmitted from the input device, provision is made for the input device to have a pointing appliance, with the pointing appliance being designed such that it is moved manually by the subject for pointing, and the input device interacts interactively with a marking such that the position of the pointing device is displayed by means on the marking on the display device.

A number of the expressions which are used will first of all be explained in the following test:

An image is understood as meaning anything which can be displayed in graphical form on a bounded surface. However, it does not necessary need to have only graphical contents, and the expression images also includes those displays which are composed to a significant extent or entirely of text. Both static individual images and dynamic image sequences are regarded as images. The latter may in turn be a sequence of images which are each perceived individually, as in the case of a slide display, or may be continuous images, or a combination of both. The images do not need to have been recorded by a camera, and they may also be displays from computer desktops or web pages.

The expression interactive in this case means that the subject is offered at least one visual display, which he actually points at using the pointing appliance.

The pointing appliance is provided with a sensor for determining its position. The position data which is determined from the sensor is transmitted to the input device.

The expression a visualization profile means a sequence of attention-gaining points. An attention-gaining point is the point on an image which is displayed by the display device and which is at one time located in the center of the subject's attention.

The expression manually moved in this case means that the subject himself actively moves the pointing appliance. The subject normally moves the pointing appliance by hand, but the possibility of other parts of the body (for example feet) being used for this purpose should not be precluded.

The essence of the invention is to use a pointing appliance, which is moved by the subject, instead of a complex eye movement camera. The subject can use the pointing appliance while the image material to be examined is displayed to him on the display device. As in the past, the subject in this case moves his eyes such that they point at the area of the displayed image (attention-gaining point) which he is looking at most of all at the respective moment. It has been found that it is not just the eyes which are directed at the attention-gaining point. Further movements are carried out involuntarily as a function of the respective attention-gaining point. The invention has identified the fact that a pointed appliance which is held in the hands is also pointed at the area which is currently being looked at most of all. This is generally done completely involuntarily. The subjects are subject, so to speak, to an internal urge to point the pointing apparatus at the area which they are currently most interested in. The invention makes use of this fact. The invention is based on the idea that this internal urge can be made externally perceptible, and can thus be made use of for measurement, by placing an appropriately suitable pointing appliance in the subject's hand.

The invention has furthermore identified the fact that these involuntary movements are carried out objectively (towards the attention-gaining point) and can thus be made use of for evaluation purposes by displaying a marking on the display device at the point at which the subject is currently pointing the pointing appliance. This results in feedback which leads to the subject pointing the pointing appliance more accurately at the image area which he is looking at most of all. This improves the accuracy of the determination of the attention-gaining point. This is because it has been found that the subject attempts to move the marking to the attention-gaining point. This may be done involuntarily, or appropriate training can be carried out in advance.

This results in a range of advantages. Apparatuses for examination of image material according to the invention are considerably less complex than those known from the prior art, which require cameras for recording eye movements. The invention requires no such specific and expensive appliances, and this results in a considerable reduction in the cost involved. Since no specific appliances are used, there is also no need to train operators specifically for these appliances. The apparatus according to the invention does not require this, and can be operated by virtually anyone. Furthermore, less effort is involved as well, compared with the conventional methods with questionnaires. No personnel are required to design a suitable questionnaire, to distribute it to the viewers, and to evaluate the responses. This therefore results overall in considerable cost advantages in terms of purchasing and operation.

A further advantage is that the results are more accurate. The measurement of eye movements is subject to considerable measurement inaccuracies. Even minor or latent eye mispositioning (strabism) which is quite common, leads to inaccurate measurement results. A further significant error source is that the relative position between the viewer and the display on which the image is being displayed can change, for example due to movement of the head. This results in errors in determining the image area at which the eyes are pointing. Even minor head movements can thus lead to considerable measurement errors. Movements such as shaking the head in emotionally particularly involved scenes thus lead to unusable measured values. Movements such as these do not lead to measurement errors with the invention. On the contrary, movements such as these in the case of the invention, for example trembling of the hands when subject to high emotional stress can additionally be recorded and are made use of for the evaluation. The invention thus allows a much more robust measurement.

A further advantage is that the recording of the reaction of the subjects takes place at the same time as its perception. This is referred to as perception-simultaneous recording. The invention thus even allows determination in real time. This results in the possibility of changing the displayed images as a function of the respective reaction of the viewer. Delays and inaccuracies resulting from subsequent evaluation, as in the case of questionnaires, can be avoided when using the invention. Furthermore, the results are available very much more quickly than in the case of methods using a questionnaire.

Overall, the invention makes it possible to examine image material with considerably less complexity and more accuracy and robustness. It is therefore possible to examine and assess the influence of image material on customers in a highly efficient manner. The simplicity and speed which the invention makes possible allow examinations to be carried out even when the image material is still in the draft stage. Owing to the high financial penalty and/or major loss of time, this was impossible using conventional methods and apparatuses. The invention therefore makes it possible to identify weaknesses even at an early stage, and thus to correct them. The invention thus opens up new fields of application in which no examinations have conventionally been carried out, for cost or time reasons. The invention therefore also makes it possible to investigate image material in fields where things happen quickly, for example on web pages.

Since the invention involves so little complexity in comparison to the conventional methods, it can also be used much more flexibly. Physically, it is not restricted to a laboratory but can be used anywhere where a computer can be operated, that is to say even in the field.

The pointing appliance is expediently in the form of a computer mouse. Many different versions of computer mice are available at low cost, and widespread groups of subjects are very highly familiar with their operation. Furthermore, they are available nowadays on virtually all computers, so that their use does not involve any additional costs.

The pointing appliance may also be in the form of a light pen or, in particular, even a laser pointer. The latter offers the advantage that the instantaneous alignment of the laser pointer is also indicated by the light dot even when the laser pointer is no longer pointing at the display device at all. This is particularly advantageous for finding and identifying major misalignments. Furthermore, it has been found that the urge which causes subjects to move to the attention-gaining point is particularly strong with regard to the light dots produced by laser pointers. It is self-evident that the pointing appliance may also be in some different form, for example as a stylus or as a touch screen.

It is preferable to provide not just one pointing appliance for a subject, but two or more for two or more subjects. It is self-evident that two or more display devices must be provided, unless two or more subjects can share one display device. Examination data from two or more subjects can thus be recorded at the same time. This allows extensive examinations to be carried out on a broad basis with a large number of subjects in a very short time. In this case, the subjects do not all need to be in one room, but may be located at different points. This was virtually impossible with the conventional apparatus, since specialists were also required at the location at which the input device is located. This did not allow examinations to be carried out on a large number of subjects at the same time. The invention therefore allows quicker examination even when there are relatively large numbers of subjects involved.

In one advantageous embodiment, the input device is arranged together with the pointing appliance physically separately from the evaluation device, and they are connected to one another via a data network, in particular a LAN or WAN. The expression LAN means a "local area network", in which the respective connected devices are arranged in the same building or in an adjacent building. One example of an LAN is the Ethernet or Firewire. The expression WAN means a "wide area network", in which the respective connected devices can be arranged at any desired distance from one another, for example in a different town, a different country, or on another part of the globe. One example of a WAN is the Internet. The physical separation between recording of the subject's response and the evaluation allows the image material to be examined locally. This has the advantage that the subjects do not need to come to a special laboratory, but can stay at any desired other location, for example at home. This effectively avoids corruption that can occur as a result of an unfamiliar environment. The input devices and evaluation device are provided with network interfaces for this purpose.

It is particularly advantageous for an event detector to be provided, which is designed to evaluate position data when a specific event occurs. This means that the position data do not need to be recorded and processed continuously, but only when specific events occur. One such event is, for example, the operation of a mouse button ("clicking"). An event detector thus allows the volume of data to be reduced compared to continuous recording. In addition, event-based supplementary information can also be obtained by means of downstream processing. Event-based additional information such as this allows the examination of the image material to be refined. For example, a timer can be provided, which is used to determine the frequency of the events over time. For example, the frequency with which the subject "clicks" in a certain time during the viewing process can be used to generate a measure of the importance that the image area currently being viewed has for the subject.

The event detector does not, however, necessarily need to be designed such that only a specific action by the subject represents an event. It can just as well also be designed such that nonactivity of the subject represents an event. For example, it is not only possible to provide for the operation of the button (clicking) to be regarded as an event to be detected, but also, instead of this, the event to be detected may be the subject ceasing to move the pointing appliance. In this case, the event detector measures the speed of movement of the pointing appliance and is triggered by means of a threshold value detector when the speed falls below a specific value.

The event detector may also record further events, for example a change in the displayed image in the case of image sequences. During the evaluation process, this simplifies synchronization of the displayed image data and of the recorded position data.

According to a further aspect of the invention, which may require independent protection, a conversion device is provided which is designed to convert position data that is output from the pointing appliance to an appliance-independent data format. This has the advantage that the further processing of the position data can be carried out independently of the pointing appliance that is used. This allows various pointing appliances which are matched to the respective purpose to be used without any need to change the data format for this purpose, and without complex adaptations to the subsequent processing of the data. The conversion device is designed to convert the measurement data from the pointing appliance from the coordinate system of the pointing appliance to an appliance-independent coordinate system. An appliance-independent data format allows different pointing appliances to be used for different image materials. Furthermore, an appliance-independent data format has the advantage that this improves the comparability of examinations. For example, it is thus easily possible to examine the same image material twice using different pointing appliances. In the case of appliance-specific data, the comparison options are greatly restricted, and are impossible at the measurement data level. In contrast, an appliance-independent data format allows comparisons to be carried out even at the level of the measured position data, that is to say without any intermediate processing. This allows two or more examinations of the same image material to be carried out with different pointing appliances in a simple manner, thus making it possible to easily identify, and if necessary to correct, any influences caused by different pointing appliances.

The conversion device is expediently connected upstream of the event detector. This allows appliance-independent data to be supplied to the event detector, which has the advantage that the event detector does need to be adapted whenever the pointing appliance is changed.

A corresponding method for examination of image data is the subject matter of the independent method claim. Advantageous developments of the method are specified in the dependent method claims. The invention also relates to a corresponding computer program product.

BRIEF DESCRIPTION OF THE DRAWINGS

The invention will be explained in the following text using one advantageous exemplary embodiment with reference to the drawing, in which.

DETAILED DESCRIPTION OF THE INVENTION

Figure 1:
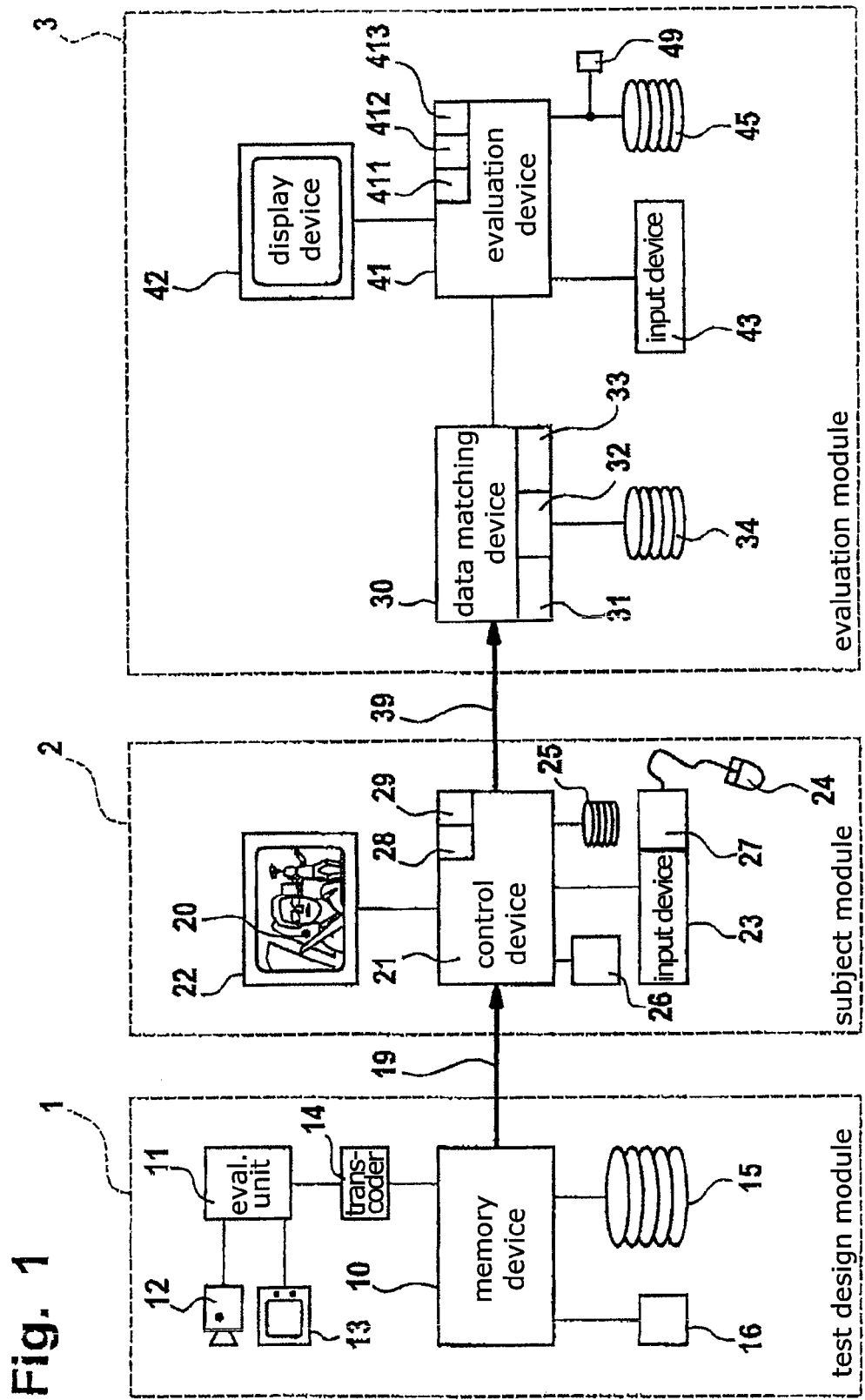
FIG. 1 shows a schematic view of an apparatus according to the invention.

FIG. 1 shows an exemplary embodiment of an apparatus according to the invention. The main components of the apparatus are a test design module 1, a subject module 2 and an evaluation module 3. The test design module 1 has a memory device 10 and devices for producing tests from image material to examined. The subject module 2 has a control device 21, a display device 22, and an input device 23 with a pointing appliance 24. It is connected via preferably unidirectional control and data lines 19, 39 to the test design module 1 and to the evaluation module 3. The evaluation module 3 has a data matching device 30 and an evaluation device 41 with the display device 42 and with an input device 43. The above-mentioned modules are expediently each in the form of a personal computer; two or more modules may also be combined in one personal computer.

Image data for images to be examined is stored in the form of digitized image data in the test design module 1. An image generation device 11-13 is provided in order to obtain the required image data from images, and is designed to carry out external and internal image generation. In the described exemplary embodiment, a camera 12 is provided for external image generation, by means of which the images to be examined can be recorded, and can be supplied as digitized image data to an evaluation unit 11. A scanner may also be provided, instead of the camera, for scanning the image material to be examined. Internal image generation is provided as an alternative to external image generation. For internal image generation, the display on the display device 13 is scanned. The screen contents of the display device 13 are, so to speak, "photographed" digitally. As in the case of external image generation, this results in digitized image data. Irrespective of the type of image generation, the image data is processed via the selection unit 11 for subsequent display on the subject module 2, and is stored in the memory device 10.

The processing comprises, in particular, the determination of the display sequence of an image sequence comprising two or more images, and the definition of how long each of the images will be displayed. For this purpose, the selection unit 11 has the following functions: it allows flexible image navigation and allows images to be displayed using various resolutions, while also allowing images to be entitled, display durations to be defined, as well as the sequence of the individual images to be defined, as well as, finally, the addition and removal of images. The parameters which are relevant to each of these functions are stored in a control file. The control file contains the parameters which are relevant for displaying and scrolling through the image sequence, in particular the time for which each image will be displayed, the rate at which the image sequence is played back expressed as a frame rate, and details about the nature of the image transitions, for example based on time, based on a subject input with the pointing appliance 24, or in some other way. The control file also contains information about what type of subject interactions will be allowed later during examination. A transcoder unit 14 is arranged between the selection unit 11 and the memory device, and is used to generate a film from the image sequence that is produced by the selection unit 11. The image sequence is expediently converted to a compressed data format for this purpose. The film contains both the compressed image sequence and the control file.

The memory device 10 is used to store image data for the images to be examined. Furthermore, the film which is produced by means of the selection unit 11 and the transcoder unit 13 is stored in the memory device 10. The memory device 10 has a bulk data store for this purpose, which is expediently in the form of a hard disk 15. In addition, a high-speed semiconductor memory 16 is provided, in which the image data to be displayed is loaded. This allows real-time display of the individual images in accordance with the sequence defined in the film.

The display device 22 in the subject module 2 is used to display the film, with the images to be examined, for viewing by the subject. The display device 22 is designed such that it can display the images with the required resolution and color depth. The display device 22 has an image memory 26 for this purpose. The image memory 26 must be sufficiently large and sufficiently fast to allow the images to be displayed exactly at the defined time. The display device 22 may be a conventional computer monitor, irrespective of whether this is a tube monitor or TFT display. However, an autonomous appliance may also be used, such as a small mobile computer (PDA=personal digital assistant) or a laptop, provided that its display is sufficiently powerful. Furthermore, projectors (beamers) or else touch screens may be used.

The control device 21 is provided in order to play back the image data that is stored in the memory device 10 in the defined sequence. The control device 21 ensures that the image data for the images to be displayed is read from the memory device 10 and is written to the image memory 26 in the subject module 2. The control device 21 is preferably designed such that it produces the image data with a certain time advance in the image memory 26. It is thus possible largely to avoid disturbances, in particular stray images or jittering, caused by read errors or overloading of the memory device 10. The control device 21 is also used to match the mage data to the respective type of display device 22. For this purpose, it transforms the image data, which is stored in an appliance-independent format, to a format which is specific for the display device 22. This transformation comprises, in particular, conversion of the appliance-independent coordinate system of the image data as stored in the memory device 10 to the specific coordinate system for the display device 22 being used. This conversion process, which is also referred to as "mapping" guarantees a standardized image display even on different display devices 22.

This input device 23 is used firstly for inputting data and secondly for connection of the pointing appliance 24. The position of the pointing appliance 24 is displayed on the display device 22 by the input device 23 by displaying a marking 20 at the appropriate point. To do this, the display device 22 uses a dedicated, first coordinate system. The pointing appliance 24 is used as an instrument for the subject to examine the images. The subject holds the pointing appliance 24 in his hand, while the images are displayed to him on the display device 22 in the sequence as determined in the film. Furthermore, the marking 20 is displayed, to be precise at the point which is determined by the current position of the pointing appliance 24. If the subject moves the pointing appliance 24, then the control device 24 interactively shifts the marking 20, corresponding to the movement of the pointing appliance 24. The subject will then involuntarily attempt to move the pointing appliance 24 while viewing the images, such that the marking 20 points at the area of the displayed image which the subject is currently paying most attention to. The position data which is output from the pointing appliance 24 during its movement is recorded by the input device 23 and is temporally stored in a memory 25. The input device 23 has an appropriate drive unit 27, which is matched to the data format of the pointing appliance 24, for the data traffic with the pointing appliance 24. In the illustrated exemplary embodiment, the pointing appliance 24 is in the form of a computer mouse. Computer mice have the advantage that they are available at low cost, and that virtually all subjects will already be familiar with their operation. They can be operated intuitively, so that the subject is virtually not distracted at all from viewing the displayed image. This makes it possible to very largely avoid corruption which occurs while the subject is concentrating excessively on the pointing appliance 24 and its movement. Owing to these advantageous characteristics, the computer mouse allows particularly simple, low-cost, low-reaction and thus reliable measurement of the image areas being viewed by the subject. However, the invention is not restricted to computer mice. Other pointing appliances 24 may also be used independently of the respective requirements of the image material, of the supply device 22 being used and the type of subject, for example light pens, touch screens, styluses or laser pointers (not shown). The important factor is that the pointing appliance has a sensor for determining the position of the pointing appliance, so that position data is produced in a second coordinate system, which is independent of the display device 22, and is transmitted to the control device 24. If a laser pointer is used, the marking 20 can be replaced by the light spot of the laser beam. Since its light spot can be perceived well, a laser pointer can be used particularly well for large display devices 2. Furthermore, like computer mice, it can be operated intuitively, since the relationship between the movement of the laser pointer and the result, namely the movement of the light spot, is particularly evident.

The control device 21 also has an event detector 28. For the purposes of the invention, events are processes on whose occurrence specific actions are carried out. In the case of the pointing appliance 24, the event is a specific operation. The processes whose occurrence governs the event vary depending on the device. In the case of a computer mouse, an event is the operation of the buttons on the mouse by the subject. The operation of these buttons is detected by the event detector 28. In the case of a different pointing appliance 24, other events may also be detected, for example the touching of the screen surface in the case of a touch screen, or the interruption in the movement with the pointing appliance being (approximately) stationary, while the subject is looking at a specific point on the display device 22. The event detector 28 monitors not only the input device 23 together with the pointing appliance 24, but also further devices. For example, the display device is thus monitored for the "changes to the screen content" event. When an event occurs, the event detector 20 is triggered, and a data record is written to a file. The data record comprises the time and the nature of the event as well as further details, for example relating to the serial number of the event and of the image which was displayed at the time of the event, as well as in the case of the pointing appliance 24—the transmitted position data. The following table shows an example of a number of data records for the event-based file:

| Image No. | Event | Event No. | X Position | Y Position | Time |
|---|---|---|---|---|---|
| 0 | Image change | 1007 | −1 | −1 | 0 |
| 0 | Mouse click | 1005 | 0.2 | 0.2 | 114 |
| 0 | Mouse movement | 1003 | 0.3 | 0.42 | 523 |
| 0 | Mouse click | 1005 | 0.3 | 0.42 | 685 |
| 0 | Mouse click | 1005 | 0.3 | 0.42 | 738 |
| 0 | "Response" | 1004 | −1 | −1 | 932 |
| 1 | Image change | 1007 | −1 | −1 | 1310 |

As can be seen from the table, with the exception of image changes, these are all events which have been caused by the subject (user-induced events). The event "image change" is determined by the control device 21 on the basis of the details which are stored in the film. The occurrence of image changes and their times are thus known. These data records are therefore not absolutely essential, but they will subsequently simplify synchronization between the film and the events which are caused by the subject. Apart from these data records which are used for synchronization, the event-based file contains only data records of events which have been caused by the subject. This file is therefore quite small, and can be stored in a text format, in particular ASCII or CSV (comma separated values). It is thus particularly suitable for transmission via a data network or for dispatch by email.

The position data which is stored in the data records is not the (raw) position data for the respectively used pointing appliance 24. Instead of this, the raw position data is converted from the appliance-specific coordinate system to an appliance-independent coordinate system. The control device 21 is provided with a conversion module 29 for this purpose. A corresponding situation applies to the coordinate system for the display device.

The rest of the processing is carried out by the evaluation module 3. For this purpose, the data is supplied from the subject module 2 to the data matching device 30, which has two or more synchronization modules 31-33. A first and a second synchronization module 31, 32 are designed for spatial synchronization. The first synchronization module 31 is designed to map the coordinate system of the image material contained in the film onto a coordinate system for the evaluation module 4. The second synchronization module 32 is used to map the position data of the pointing appliance 24 from the appliance-independent coordinate system onto the coordinate system for the evaluation module 3. A third synchronization module 33 is designed for time synchronization and is used to synchronize the timing of the data from the pointing appliance 24 to the image data, using the event-based file and the control file.

The data that has been synchronized in this way is made available to the evaluation module 3. The evaluation module 3 is designed to evaluate the data spatially with respect to time, and with respect to time and space. For this purpose, the evaluation module 3 is provided with a computation device 41, with an input device 43 and with a display device 42. A memory 45 is provided for storage of the results of the evaluation.

The data can be analyzed manually or automatically by means of the computation device 41, for time evaluation. An automatic analysis module 411 is designed to analyze the data on the basis of image changes. However, it can also be analyzed manually, and this case the respective times for analysis can be chosen freely.

The image data is subdivided into regions or individual objects for spatial evaluation. This can be done automatically by the computation device 41 by means of suitable image classification modules 412, 413, or it can be carried out manually by a user (evaluator). The spatial evaluation is used to group and also select formal or semantic objects or regions, such as photographs, text, animations, etc. Automatic image classification is designed to be based solely on the output image or additionally to make use of the determined pointing data in the evaluation. Various methods are implemented, that is to say raster-oriented, with a predefined raster being placed over the image, by means of a parser, which interprets information contained in the image about the displayed objects (in the form of the document object model for html documents) or, finally, by means of conventional image identification methods. The methods mentioned above may each be used in their own right, or combined with one another. Manual post-processing is nevertheless frequently required.

The results obtained from spatial evaluation can be output in a graphical form or in the form of data. The graphical output may, in particular, be in the form of so-called heat maps. Heat maps are based on a raster display on the image to be examined with additional elements in order to emphasize certain areas. They are used to display the local distribution of the measured position data. This is generally done by means of color markings, by using a specific color (for example red) to identify areas that are viewed in particular, and thus to emphasize them. If the color red is used for identification, the areas which are locked out in particular are given a reddish coloring, and they thus appear to glow red. This is why they are called heat maps. The computation device 41 carries out three steps in order to calculate the heat maps: calculation of a two-dimensional histogram of the position data over the image plane (subdivided into "bins"), calculation of the sum of the histograms of the adjacent "bins" and, for outputting for each "bin", normalization as well as addition of the weighted sum of the adjacent "bins". The result is a scalar value to which a specific color and/or transparency is assigned via a table. In the case of data-based analysis, the examined image is subdivided into regions. Attention-gaining values are then calculated for each region on the basis of the position data, and these values are expediently normalized with respect to the size of the regions. This makes it possible to read how the attention is distributed over the individual regions. Further knowledge is obtained by analysis over time, as will be explained in the following text.

The following methods can be used for combined spatial/ time evaluation: production of a "heat movie", carrying out string analyses, or Markov analyses, or carrying out sequence analyses. A "heat movie" comprises animated heat maps. The heat movie may be based on a time scale or on an image change scale. For the latter, it is absolutely essential to have two or more images, while a heat movie can be produced just for one image by using the time scale. For this purpose, the time axis is subdivided into equal sections, and a specific sub-heat map is calculated for each section. In the case of a "string analysis", regular features are looked for in the time sequence of the input data, and are displayed. String analyses relate to the already mentioned regions. A letter is allocated to each region and is used to determine the sequence in which the regions are being looked at. This therefore results in a sequence of letters. This makes it simple to determine which regions are looked at at the start of an image representation, and which regions at the end. The region analysis is thus particularly suitable for analysis of the dynamic attention distribution over time. In the case of a "Markov analysis" changes from one region to another are observed. This is done by assessing the probability of a transition from one region to the next region. This results in probability matrices, which can be evaluated using various methods that are known from information theory. For example, the spatial variance of the sequences can be determined. This makes it possible to identify typical transitions between regions. It is thus possible, for example, to determine which regions draw attention to themselves, irrespective of the point of origin, and which regions are, so to speak, persistently ignored. A "sequence analysis" looks for typical region sequences.

If the image material has been looked at by two or more subjects, the evaluation processes explained above can be applied individually to each subject, or averages can be formed over two or more or over all of the subjects, thus allowing target-group-specific evaluations in accordance with the requirements for market research studies.

The results of the evaluation are displayed on the display device 42 and are stored as a result file in the memory device 45. An export device 49 is provided in order to allow the results to be used externally as well, for example for further evaluation. This export device 49 accesses the computation device 41 and the memory device 45, and transmits the result file. This makes it possible to transport calculated visualizations, data results or else raw data. Excel tables, text files (in particular in the form of CSV files) and various graphics formats, such as jpg, gif, tif, mpeg or avi may be used as export formats.

If the evaluation is intended to be carried out taking account of the time pressure on the subjects, the sample module 2 is preferably provided with time measurement devices and, possibly, also with time display devices (not illustrated). This makes it possible to include time on a better and more controlled basis as an assessment factor.

Figure 2:
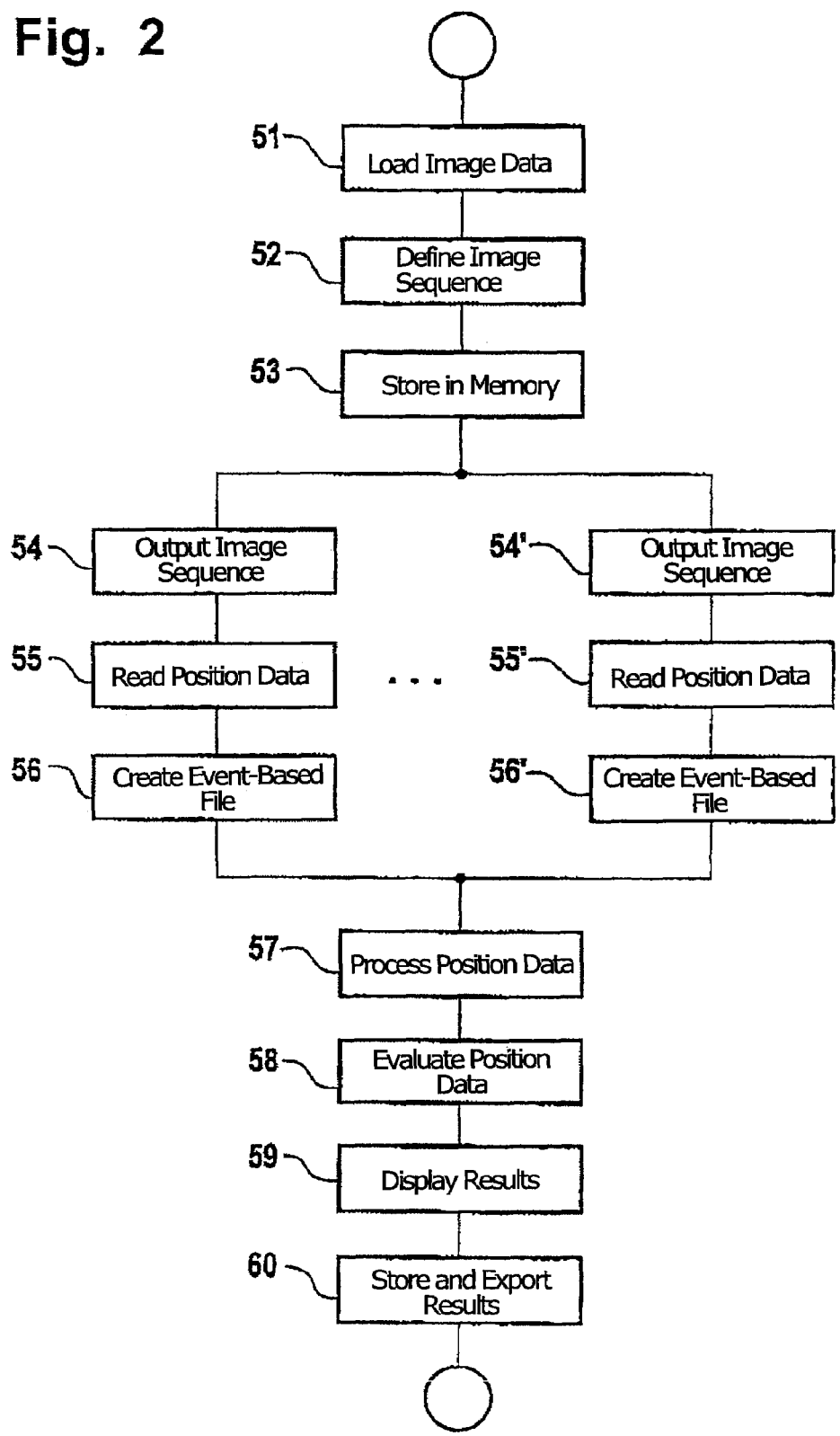
FIG. 2 shows a schematic view of a flowchart for the corresponding method according to the invention.

The method according to the invention takes place as described briefly in the following text with reference to FIG. 2.

In a first step 51, the image data for the images to be examined is loaded. Sources for the image data are the camera 12 and the display device 13. In a second step, this image data is used as the basis to define an image sequence by means of the selection device 11, and to produce further control information, for example relating to the time duration and image changes. The transcoder module 14 is then used to produce the film and, finally, this is then stored in the memory device 10, in a third step 53.

For the next step 54, of outputting the image sequences which are defined in the film, the film data is first of all transmitted via the network line 19 from the test design module 1 to the subject module 2. The images are then displayed on the display device 22 to the subject, in a step 54, by means of the control device 21, in the sequence defined in the film. After or during this, the subject moves the pointing appliances 24. Position data is thus produced, reflecting the location and the profile of the subject's attention point on the displayed image. The position data is then read, in a step 55, via the input device 23, to the control device 21 and, in the process, the marking 20 is displayed on the display device 22, moving in accordance with the position data that has been read in, by means of the control device 21. In the next step 56, the event detector 28 processes the data from the pointing appliance 24, and thus produces the event-based file. It is possible to provide not just one subject module 2, and a second and further subject modules can also be provided, in which the same steps (54'-56') are carried out as in the first subject module 2. However, these steps would not necessarily need to be carried out in all of the subject modules at the same time. This may be done, but is not essential. It is actually one of the advantages of the invention that, although two or more subjects can be used for examination purposes in a simple manner, they do not need to be combined, however, either physically or in time.

For the subsequent steps, the determined position data is transmitted via the network line 39 to the data matching device 30, where it is protected in a step 57 and is then transmitted in a step 58 and is evaluated by the computation device 41 in the evaluation module 3, to be precise on the basis of the details of the user there. Finally, in a step 59, the results obtained from the evaluation process are displayed on the display device 42 of the evaluation module 3. In addition, the results are stored and are provided for export via an appropriate export device 49; this is done in a step 60.

Figure 3A:
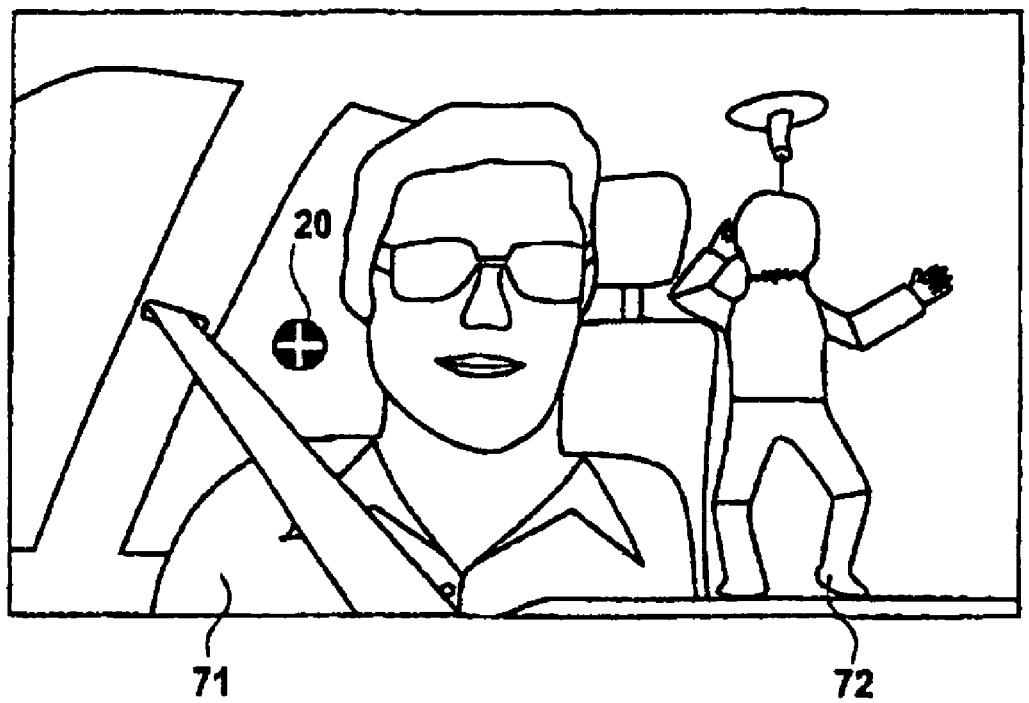
FIg. 3 shows an example of an examined image.
Figure 3B:
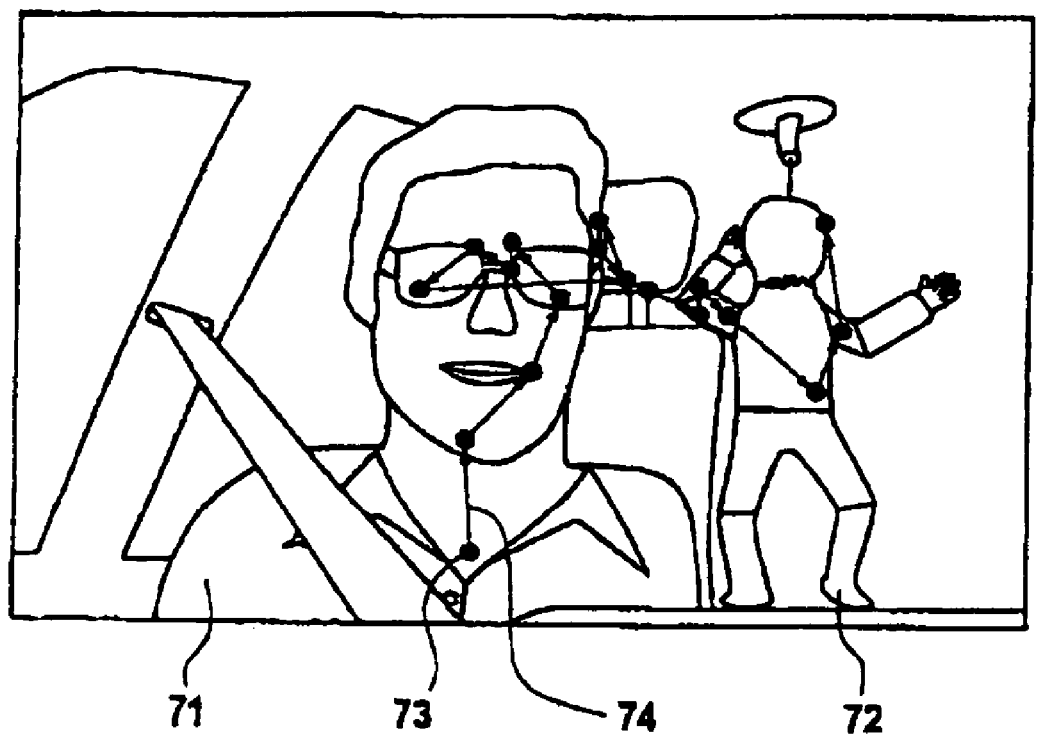

FIG. 3 shows one example of a result after the evaluation. The upper figure (FIG. 3a) shows how the display device 22 provides the subject with a display during the examination. The figure shows a person 71 who is displayed sitting in a car, although only a part of the upper body of this person can be seen. A jointed puppet 72 is also shown, which is suspended on the front windshield of the car and whose feet are supported on the dashboard of the car. The illustration also shows the marking 20, whose position can be changed manually by the subject by moving the pointing appliance while viewing the film. The lower figure (FIG. 3b) shows the profile adopted by the attention-gaining points of the subject when viewing this image. In addition, this figure also shows the individual attention-gaining points 73. Since the eye has a tendency to jump in a virtually discontinuous manner from one point to the next, the individual attention-gaining points 73 are connected in their chronological sequence by means of arrows 74, in order to assist clarity. FIG. 3b clearly shows how the subject's view moves from the lower area of the person 71 upwards to the spectacles, moves backwards and forwards over virtually the entire width and then, finally, changes over to the jointed puppet 72, and then views this in more detail.

Figure 4A:
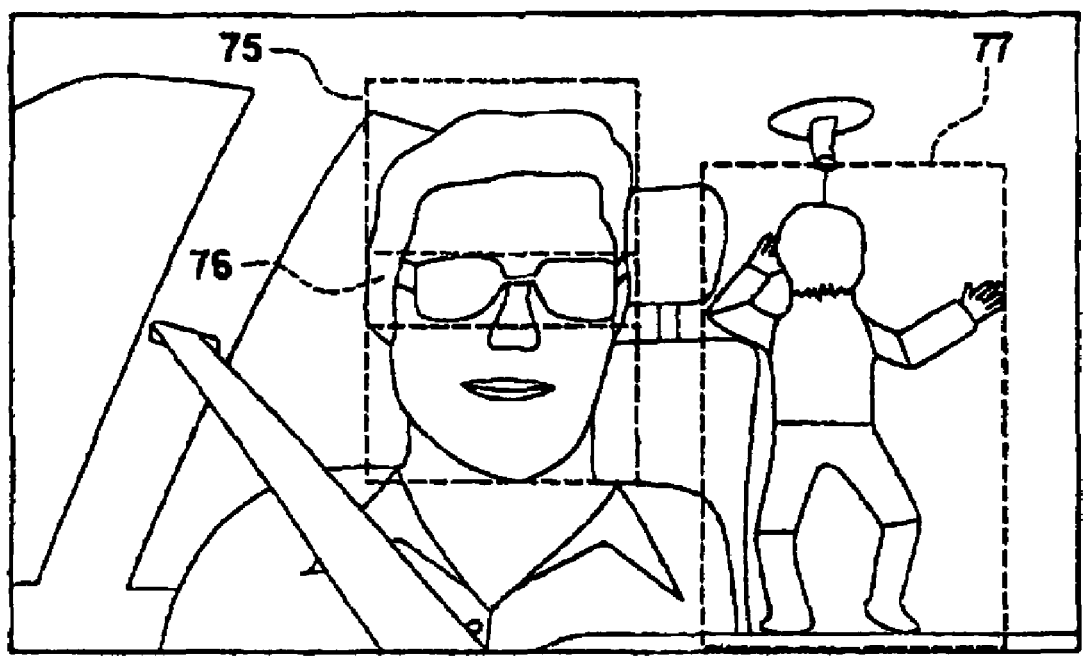
FIG. 4 shows an example of a result of an evaluation.

FIG. 4 shows a result of the spatial evaluation. FIG. 4a shows the illustration from FIG. 3a once this has been processed by means of the image classification modules 412, 413. In the spatial evaluation of the figure, three regions have been classified, a "head" region 75 and an "eyes" region 76, which surround the head and the eyes, respectively, with the spectacles of the person 71, as well as a "wobbly man" 77, which surrounds the jointed puppet 72.

Figure 4B:
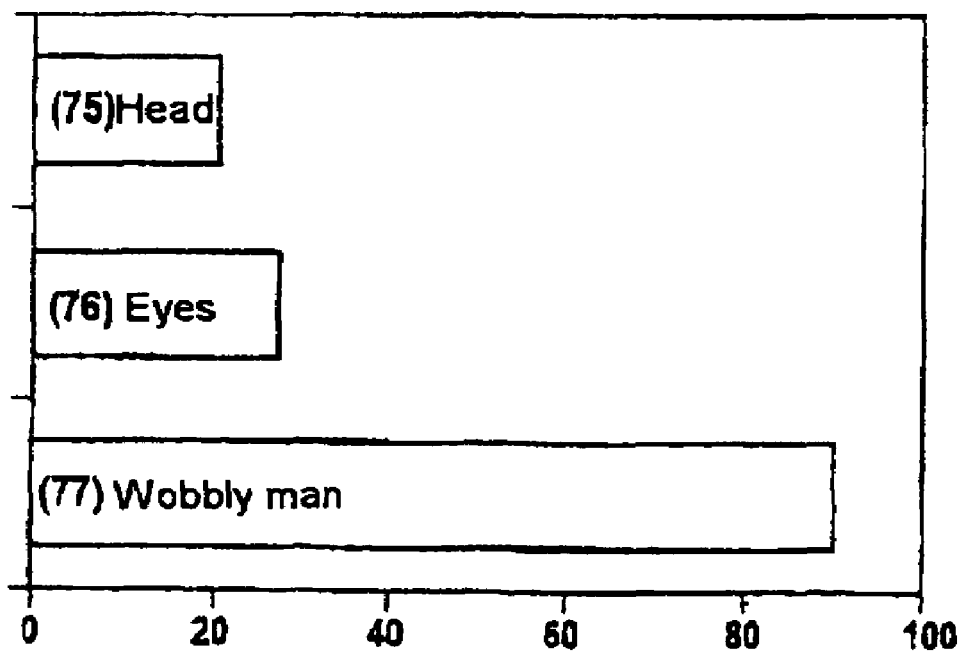

FIG. 4b shows the frequency with which a group of subjects has looked at the respective regions. This shows the respectively determined frequency with which the three regions "head" 75, "eyes" 76 and "wobbly man" 77 regions are looked at. This is a measure of the portion of the attention of the subjects which has been concentrated on the respective regions. As can be seen, most attention was paid to the "wobbly man" region 77.

When carrying out a combined spatial/time evaluation, two or more successively staggered columns can be illustrated, as in FIG. 4b, instead of one column. Each of the columns, which are staggered one behind the other, in this case represents a specific time. This makes is possible to see which region has been looked at to what extent at what time. This makes it possible to determine attention profiles. This is a particularly valuable function for assessment of image material. For example, the image material to be examined may contain a brand mark which represents the company which is thinking of using the image material to be examined, for example for advertising purposes. It is then possible to investigate whether the region with the brand mark is that region to which attention has been drawn at the end of looking at the image, and whether, in consequence, there is a high probability of the brand mark still having a "subsequent effect" in the memory of the viewer after some time. Profiles such as these can be determined by means of a spatial/time evaluation.

It is self-evident that the image material can also be evaluated and presented in other ways, for example by means of heat maps.

Figure 5:
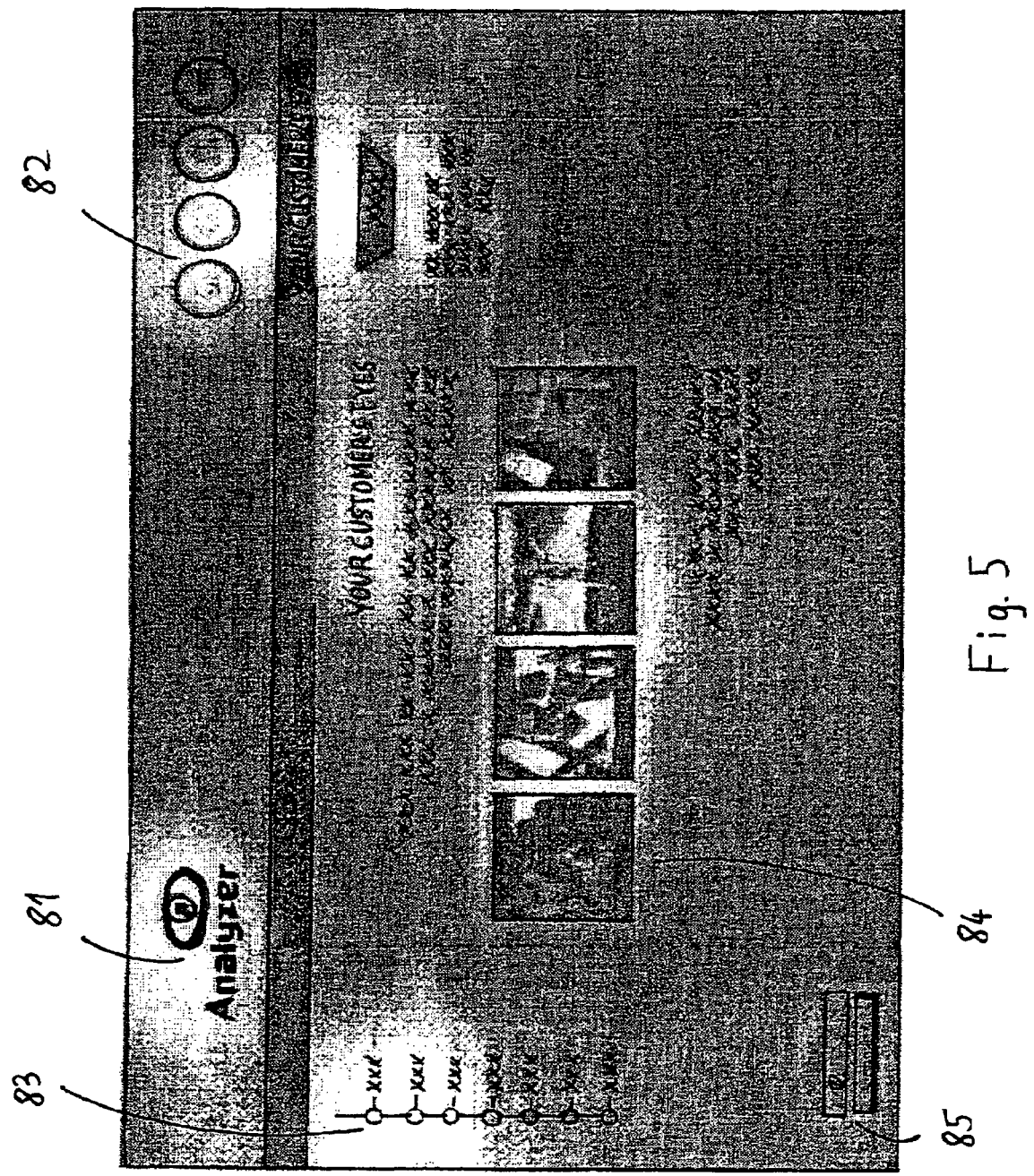
FIG. 5 shows a further example of a result of an evaluation.

FIG. 5 shows one example of a heat map. This shows the result of an evaluation in which the image material to be examined is a web page. The essential components of the web page are an illustration of the company logo with details of the company name 81, a graphical representation of button areas 82 for navigating on the web page, a tree-like summary representation of the contents of the web page 83, as well as an arrangement of a number of FIG. 8, for example in the center of the web page, and with a contact capability for electronic mail 85 in the bottom left-hand area. An investigation was carried out to determine which of these areas had drawn the attention of the viewers, in particular. The result of the investigation is shown by different brightness. The areas 81 to 84 are in bright colors. This means that these areas have been noticed to a greater extent by the viewers from the rest of the web page, for example the area 85. The different brightness level is a measure of the frequency with which the respective areas have been looked at. For example, it can be seen that the area 82 has a brighter color and that more attention has therefore been paid to it than to the area 81. In other words, this means that the button areas relating to the navigation on the web page have resulted in greater attention than the details of the company name with the logo. If, for example, the aim of the web page is for the viewer to pay particular attention to the company name, then it can be seen that this aim has not yet been achieved with the present layout of the web page. The web page can then be reconfigured, and the reconfigured web page can then be assessed once again using the method according to the invention. In this way, it is possible in the end to come to a form which optimally satisfies the stated requirements.

Figure 6:
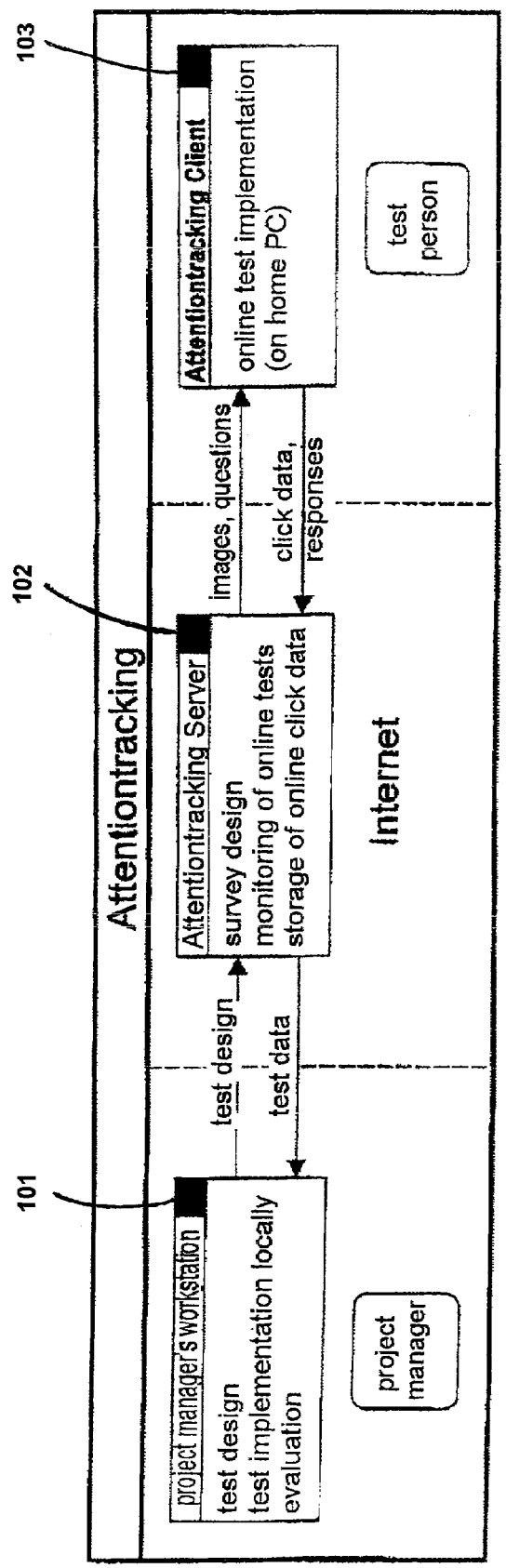
FIG. 6 shows an overview of the main constituent of a preferred embodiment of the invention and their interaction.

In a preferred embodiment the design module 1 is integrated in a project manager's workstation 101. The subject module 2 is divided into an Attentiontracking server 102 and an attention tracking client 103. The evaluation module 3 is integrated into the project manager's workstation 101, too. An overview of this is given in FIG. 6. By virtue of this the project manager for an Attentiontracking study can control the sequence from his workstation 101. It is used for designing, testing, managing, inspecting and evaluating attention tests. Advantageously, it comprises a commercially available PC with an internet connection. The functionality of the workstation is provided by software functions as outlined above.

Once a test has been designed at the project manager's workstation 101 it is transferred to the Attentiontracking server 102. Once it is there it is ready to be used in an Attentiontracking study.

The Attentiontracking server provides various control and inspection mechanisms for embedding attention tests into online surveys which, besides any number of attention tests, can also comprise further tests. In addition, the server can be used to produce hyperlinks for starting the online surveys. These hyperlinks are sent to test people. They are expediently sent by electronic mail. The market has providers who handle the sending of such hyperlinks in conjunction with an invitation to take the test as a service.

The test people normally sit in a familiar environment, like at a home PC, on which the Attentiontracking client 103 is executed. In this preferred embodiment, the Attentiontracking client 103 is a combination of Javascript and HTML which is executed in a commercially available Internet-browser, so that no kind of installation is necessary. The test people have, in anticipation, already declared themselves ready to participate in such surveys. They use the hyperlink to start the online survey, in the course of which the test material is presented in the Internet browser and the attention data from the test people are recorded. When the collection of data is complete, the recorded data are transmitted to the Attentiontracking server 102 via the Internet.

The project manager monitors the progress of the survey from his workstation 101 and, at the end of the field time, downloads the test data to his workstation. Then, the data are evaluated with the aid of software and are put into a form suitable for presentation.

In the following the project manager's workstation 101 will be illustrated in more detail.

Figure 7:
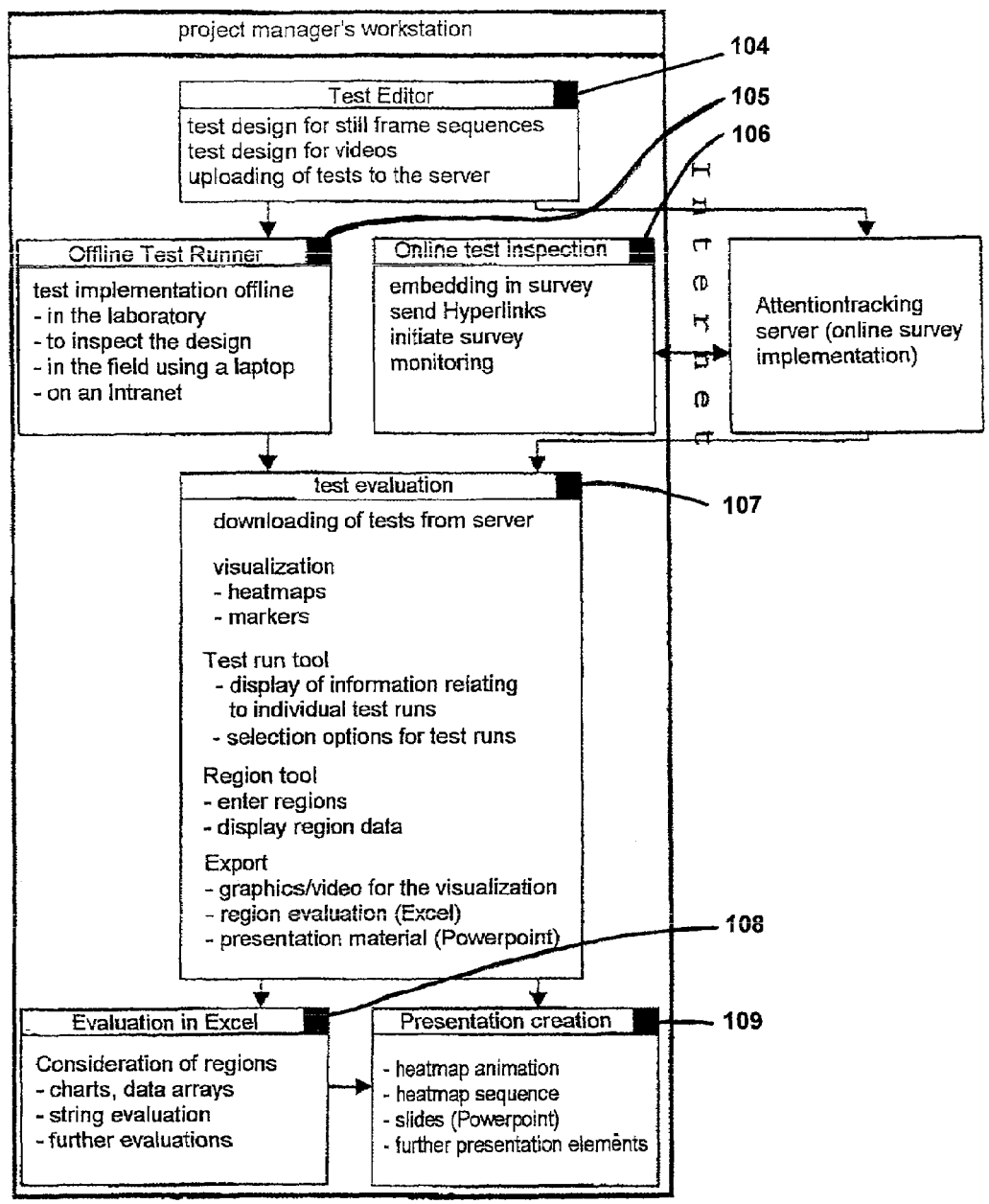
FIG. 7 illustrates the processes of a project manager's workstation.

FIG. 7 shows the components of the project manager's workstation 101. The workstation comprises a commercially available PC with an Internet connection and optionally a scanner. The tasks shown in FIG. 2 are supported by software.

Project manager's workstation 1 is comprised of
    Test Editor 104
        selection of image files or video files
        input of image display time (in the case of image files)
        input of further presentation parameters, e.g. image size
        storage as Attentiontracking project file
        uploading of the project to the Attentiontracking server 102 using a Test Editor interface 110 component
        stipulation and design of other opinion poll parts (non-Attentiontracking) in interaction with the Test Editor interface 110
    Off line test Runner 105
        opening of an Attentiontracking project file
        display of the image material in line with presentation parameters using standard control
        recording of all mouse events
        storage of the mouse events in the Attentiontracking project (test run ID, x-coordinate, y-coordinate, instant)
    Online test inspection 106
        initiation or stopping of an opinion poll by calling up a survey initiation component 112 of the Attentiontracking server 102. The entire communication with the server takes place using HTTP requests
        retrieval of hyperlinks for test runs from the Attentiontracking server 102 sending of invitations to test people by Email.

querying of the opinion poll status of a survey monitoring component 113 of the Attentiontracking server 102 display of the opinion poll status (active/inactive, number of complete opinion polls, number of terminated opinion polls)

Test Evaluation 107 opening of an Attentiontracking project file downloading of online survey data for the project (Attentiontracking data and other opinion poll data) in interaction with the result download 114 component. The interaction takes place using the HTTP protocol.

storage of the online survey data in the project file visualizations:

marker visualization: mouse clicks are represented by circles. Optionally, the circles are connected by arrows according to their sequence in time. The circles and arrows are entered into the corresponding images by standard graphic calls.

heatmap visualization: from the click data, a histogram is calculated and is entered into the corresponding image using standard graphics routines.

for both forms of the visualization, all of an image's click data are used as standard. Optionally, any desired time window can be prescribed from which click data are used for the visualization.

test run tool:

the test run tool shows survey data in the form of a table. One row is displayed for each test run.

each row can be selected or deselected. Deselected test runs are not processed in the case of visualizations and evaluations.

the columns in the test run table contain survey features (data relating to the test person, technical data for the test run such as screen size, browser version etc.).

clicking on a column header sorts the table according to the corresponding feature.

by sorting according to particular features and marking particular feature characteristics (e.g. sex=male), it is thus possible to form visualizations and evaluations on the basis of specific target groups.

by erasing a row, it is possible to remove survey data from an Attentiontracking project for cleanup purposes.

region tool:

the tool allows the mouse to be used to enter regions into the image material. Each region can be named and provided with a region code. Entry is implemented using standard graphics routines.

the region tool shows regions in table form. Each row contains one region. The columns contain the name, the region code, the size and the percentage share of mouse clicks.

regions can be erased from the region tool export:

the current visualization (marker or heatmap) can be stored as an image file.

a video (AVI format) can be produced which shows the current visualization over the course of time. To this end, the time window on which the visualization is produced is shifted systematically over time. Each visualization is stored as a still frame, and a video file is produced from the still frames.

regions, click data and test run features can be stored in the file system as separate text files.

Excel export: all click data, test run data and regions can be stored as an Excel file with separate tables sheets. The communication with Excel is implemented via an ActiveX interface.

Powerpoint export: the current visualization can be stored as a Powerpoint slide. Optionally, the regions are also exported at the same time. In addition, all the images in a presentation can be stored as a slide. The communication with Powerpoint is likewise implemented via an ActiveX interface.

Evaluations in Excel 108 the survey data exported as an Excel file can be evaluated using macros developed specifically for the purpose and can be displayed in the form of charts. The macros have been programmed in Microsoft Excel and are available in the Excel files which have been generated by the test evaluation 107.

calculation of effect indicators: For every region code which has been entered in the region tool, the following standard indications are calculated: time-to-contact, contact probability, percent returns, Markov matrix, percent attention, incidence rate. The indicators are inserted into the Excel document as table sheets.

a database is generated for target group comparisons. A table sheet is produced in which the database functions of Excel have been used to implement any desired selection options for test run features. For the selected group, the mean values of the Percent Attention and Time-to-Contact indicators are calculated and are displayed as a chart. If a plurality of selections have been made, the difference between the groups can be displayed as a chart.

support macros for coding questionnaire inputs. Value ranges can be divided into sub ranges. Features can be distributed over a plurality of columns. The distribution of the features is displayed in the form of a chart.

support macros for the sample's analysis customary in market research. If the survey has collected age and sex, the distribution of the age and of the sexes in the sample is displayed in the form of charts which can be transferred directly to presentations.

evaluations over time. The percentage attention for each region is evaluated over time using a macro and is displayed in presentable charts.

Presentation creation 109 the results and visualizations produced in the test evaluation 107 and new evaluations in Excel 108 can be imported into visualizations and animations in Microsoft Powerpoint using macros developed specifically for the purpose. The macros are implemented in a Powerpoint presentation.

heatmap animation: various graphics files which have been produced in the course of the test evaluation 107 are imported and are formatted as animation. The formatting is such that still frame sequences are played back like a video.

heatmap sequence: graphics files can be imported and arranged systematically on a slide. Optionally, the size of the graphics file is adjusted in this case such that all the graphics fit on one slide.

the attention profile can be displayed using numbered arrows. A macro analyses the arrows and creates an animation therefrom in which the arrows appear in the order of their number.

By means of a test editor 104 the manager specifies the image material which is to be tested in the form of still frames or videos and to stipulate the order and period for displaying said image material interactively. The tests can then be stored locally or can be uploaded to the Attentiontracking server 102.

The tests are normally implemented on the online Attentiontracking server 102. With the assistance of an online test inspection software module 106, the project manager controls the entire progress of the online survey. To this end, the Attentiontracking test is embedded into a classical online opinion poll. The online test inspection delivers functions for testing the opinion poll, for sending invitations to take part in the test and for monitoring the correct progress of the survey up to the end of the survey.

Locally stored tests can also be tested locally (i.e. without involving the Attentiontracking server 102) using an off line Test Runner 105. In addition, the off line test Runner 105 is used to execute tests on computers which are not connected to the Internet. This is the case, by way of example, with tests using a laptop in the field. In such cases, the test is copied from the Test Editor to the laptops, on which they are implemented using the off line Test Runner. The test data are copied back to the project manager's workstation for the purpose of evaluation.

The attention data are evaluated in a test evaluation module 107 together with any other survey data. In the case of online test implementation on the Attentiontracking server 102, they are first automatically downloaded to the project manager's workstation 101 from the server 102 for this purpose.

Test evaluation is aided and accompanied by evaluation software. This affords various options for visualization, evaluation and the conditioning of the test data. Forms of visualization are "markers" and "heatmaps" as discussed above.

Markers show all the attention points of test people using symbols on the image materials. The symbols can optionally be visualized in connection with arrows in order to show the time sequence of the attention points.

Heatmaps (FIG. 5) graphically show a histogram of the attention data on the image material. It is likewise possible to show the difference between two histograms. The graphical display of the histograms is implemented on a technical basis by virtue of the color or brightness of pixels which correspond to the histogram being altered.

The evaluation software also comprises a "test run tool" which can be used to manage the test runs. The tool displays the test runs in the form of a list containing attention data, technical data and any other survey data, such as sociodemographic data.

In the test run tool, the user (project manager) can select individual test runes or groups. All evaluations and visualizations are then implemented only for the selected group. This allows evaluations which are specific to target groups to be performed.

For the purpose of evaluating the attention data, the evaluation software provides a "region tool". This provides an interface which can be used to enter particular regions into the image material. For each of the regions, the size and the relative number of attention points are automatically calculated and displayed. In addition, the region tool provides the option of exporting attention data to a spreadsheet software module 108.

For the spreadsheet software (e. g. Microsoft Excel), a number of macros are available which assist further evaluation and allow the output of charts. These macros provide comprehensive evaluation functions. Inter alia, the "string-editing" and "Markov-evaluation" methods scientifically established for view measurement have been implemented. In addition, various advertising effectiveness indicators can be calculated, for example the indicators "time-to-contact", "stickiness" and "contact probability". These indicators each relate to graphical elements of the test material, such as the logo of a display.

Besides export to the spreadsheet, which is used primarily for processing the data further, there are further export options:

1. The visualizations can be exported as bitmap graphics.
2. The visualizations can be exported as video showing the visualization in the course of time.
3. The histogram underlying a heatmap can be exported as a text file.
4. The raw attention data can be exported as a text file.

In market research, it is normal practice to deliver survey results and analyses in the form of presentations. This is done by the presentation creation module 109. A presentation software (e. g. Microsoft Powerpoint) has macros available which can be used to incorporate the visualizations from the test evaluation 107 and results of the evaluations in Excel 108 into the presentation in a form which is suitable for presentation 109.

Attentiontracking Server 102

Figure 8:
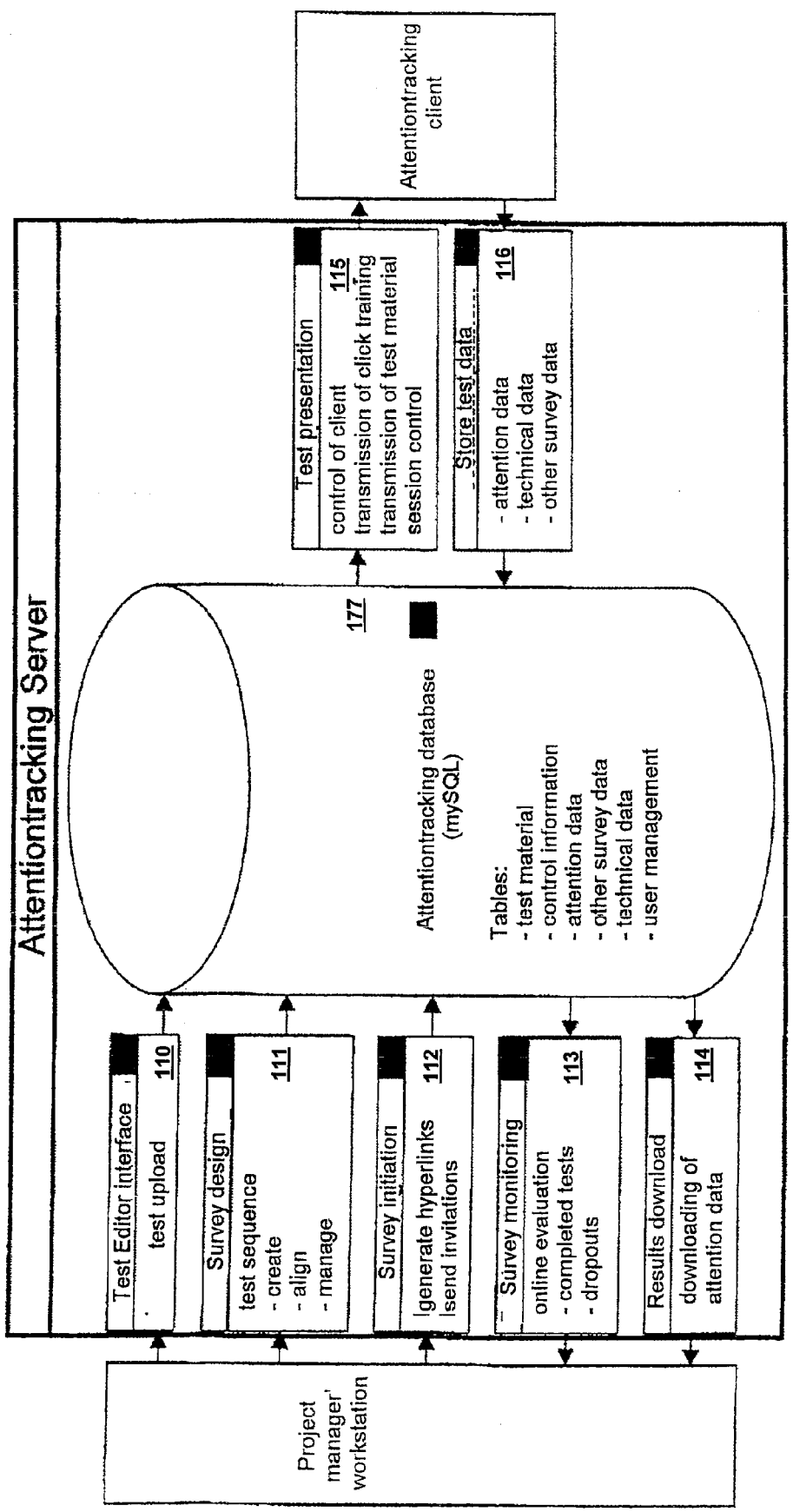
FIG. 8 shows a processes involved with a server unit.

FIG. 8 shows the components of the Attentiontracking server 102. The Attentiontracking server 102 is used for implementing Attentiontracking surveys online.

The Attentiontracking server 102 comprises one or more physical computers on the Internet. An MySQL database has been implemented which stores presentation data and survey results. The server communicates with the project manager's workstation 1 and with the Attentiontracking client 103 using Internet protocols. Interaction with these components is afforded on the server by PHP scripts which are specified below:

Test Editor interface 110: The Test Editor 104 allows a script to be called up which receives an Attentiontracking project file using Internet protocols and stores this in the database.

Survey design 111 provides an interface for embedding Attentiontracking tests into surveys. The remaining survey parts are connected to the Attentiontracking test by hyperlinks such that they run sequentially in the course of a test run and the survey data produced in the process are stored in the Attentiontracking database 177 under a common identification number (SessionID).

customizable scripts can be used to control such test sequences on the basis of test person inputs or by random variable. A survey thus comprises one or more test sequences which are controlled alternatively or sequentially.

the component provides a simple test environment for test sequences. An URL parameter is used to turn on a debug mode. During debugging, a test sequence is executed and at the same time debug information is output in an extra frame. In debug mode, input field checks are turned off and unrestricted navigation is possible within the test sequence.

Survey initiation 112 this component generates any desired number of hyperlinks on request by the project manager. The links are each identified by a unique ID number (test person ID). The ID number is stored during the test run together with the survey data in the database. As a result, the test runs can be explicitly associated with the test people, and test repetitions can be recognized. The ID numbers are coded, so that test people cannot corrupt the result by manipulating the hyperlink. The hyperlink contains the test sequence ID, likewise in coded form. This allows the test presentation 115 component to select and display the correct presentation data during the test run.

the hyperlinks can be incorporated into predefined Emails which can be sent to a prescribed address base.

Survey monitoring 113: All the test sequences can be displayed in a tabular overview. For each test sequence, the name of the test sequence, the ID No, the number of ended/unended test runs and the maximum number of test runs are displayed. The list can have new test sequences added to it or old ones erased from it. For each test sequence, the maximum number of test runs can be input.

Result download 114: This component is called up by the test evaluation 107 component. On request, a script provides a list of all the test sequences into which a prescribed Attentiontracking project has been incorporated. A second script provides all the test run Ids for a prescribed test sequence, and a third script provides, for a prescribed test run ID, the survey data stored for it in the Attentiontracking database 177.

Test presentation 115: This component is called up by the triggering of a test person hyperlink. A PHP session is started and the test material (image data, HTML code) and scripts (Javascript) are transmitted to the Attentiontracking client 103.

Test data storage 116: The survey data for a test run are received by the Attentiontracking client 103 and are stored in the Attentiontracking database.

Attentiontracking database 177. This database stores the following data:
test material
control information
attention data
other survey data
technical data for the survey
project data.

The server can comprise a plurality of physical computers and, in the preferred embodiment, is in the form of an Internet server. The server comprises a relational database in which all the test-related information is stored.

Implemented on the server are a plurality of interfaces for the project manager's workstation in the form of PHP scripts:

1. A Test Editor interface 110 which receives finished tests from the Test Editor on the project manager's workstation and stores them in the database.
2. A survey design module 111 provides a functionality for combining various types of tests into a test sequence. The test can in this case be Attentiontracking tests, questionnaire pages or other test procedures. A test sequence determines the flow of a full test run. A survey can comprise various test sequences which are completed by various interviewees. This allows surveys which present different test material to various groups of people.
3. A survey initiation module 112 provides functions for starting online surveys. For this, hyperlinks are generated which can be used to start the test runs on computers on the Internet and to implement them using the Attentiontracking client 103. The hyperlinks are normally either sent to test people by electronic mail or are incorporated in web pages. In both cases, the test run starts when the hyperlink is called up.
4. A survey monitoring module 113 can be used by the project manager to inspect the correct progress of the online survey from his workstation. In particular, the project manager can use this module to establish when the desired number of test runs has been reached. To this end, the survey monitoring module interacts via the Internet with the online test inspection module 106 on the project manager's workstation 101.
5. A result download module 114 provides the functionality for downloading the results of the survey to the project manager's workstation 101 for further evaluation, where they are processed further in the test evaluation 107 module.

In addition, the Attentiontracking server comprises two modules for interacting with the Attentiontracking client 103 which are likewise implemented in PHP and HTML:

1. The test presentation module 115 is started by the triggering of a hyperlink for a test person. It provides the client with the survey material in the form of web pages in the manner stipulated in the survey design. In addition to the survey material, a training procedure is also provided which the test people need to complete before the actual test run is started.
2. A store test data module 116 receives the survey data from the client and stores them in the database. In the case of Attentiontracking tests, these are attention points.

On the basis of client-server architecture, the Attentiontracking server 102 can interact with a large number of Attentiontracking clients 103 simultaneously. In this way, large numbers of surveys can run asynchronously.

Attentiontracking Client 103

Figure 9:
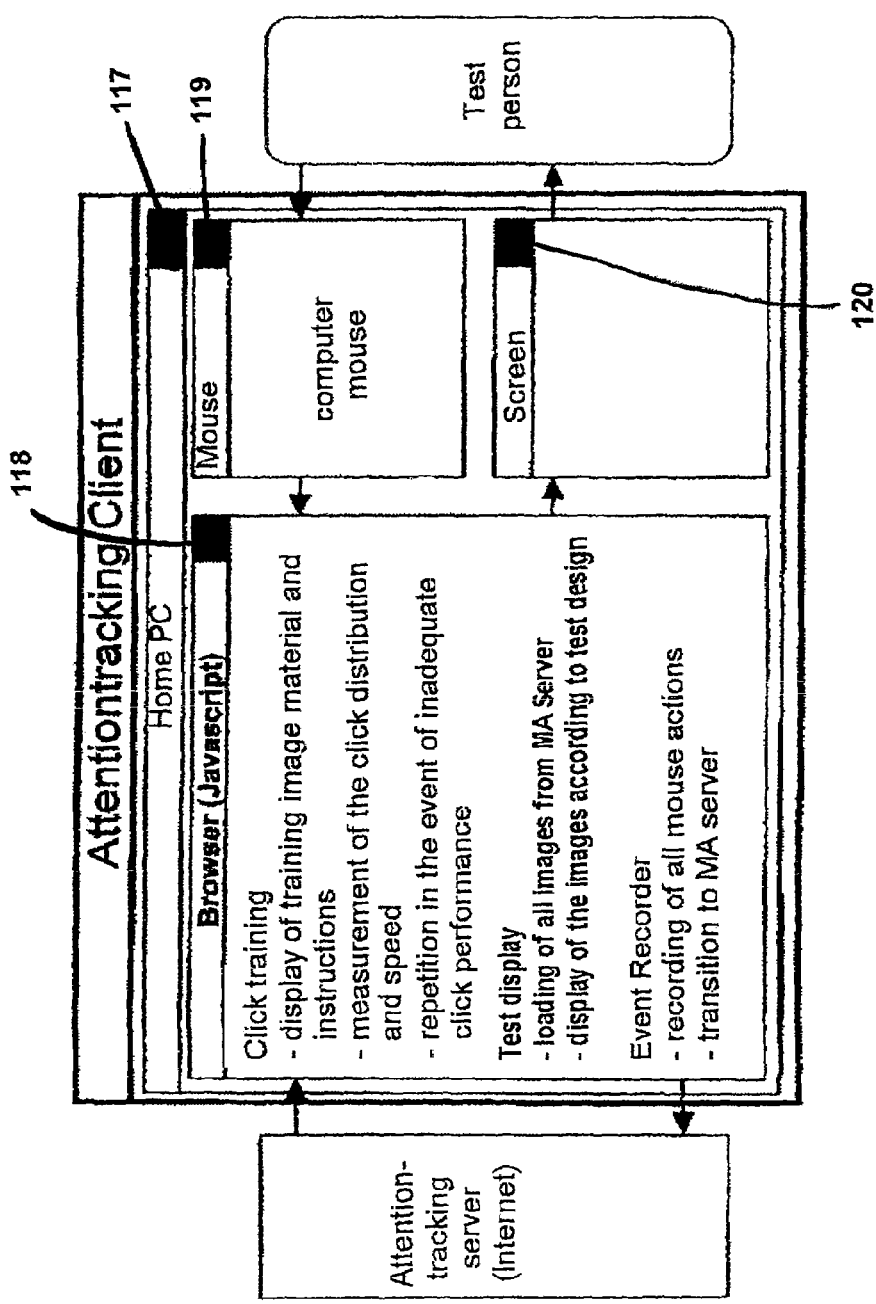
FIG. 9 shows a processes involved with a client unit.

FIG. 9 shows the components of the Attentiontracking client 103. The client 103 comprises commercially available computer hardware 117 with an Internet connection and a computer mouse 119. The devices can be at any location. The computer needs to have an Internet browser 118 installed on it. This is discussed in more detail below:

The Attentiontracking client 103 receives test data from the Attentiontracking server 102, displays them on the survey computer—normally a home PC—and sends the collected data to the Attentiontracking server, again via the Internet. The underlying software is continually matched to new survey computers and browsers in order to cover a broad spectrum of survey options. As an alternative to a PC, PDAs or mobile telephones can also act as survey computers.

Home PC 117: A standard PC with an Internet connection.

Browser (Javascript) 118:
a modern Internet browser which supports Javascript. At present, the browsers Netscape/Mozilla, Internet Explorer and Opera are supported. If the test material comprises still frames, the scripts other than those for videos are used.

click training: click training is a flash animation which is executed in the browser's full image window. The test person needs to master a number of difficulty levels—like a game—in order to complete the training successfully:

level 1: fast clicking. A cross is displayed which needs to be clicked on at a minimum speed level 2 to level 4: Objects are revealed on various background images. All the objects have a number of points. The test person needs to click a minimum number of points in a few seconds. The parameter for the presentation have been set such that the level of difficulty increases and a minimum speed of one well-directed click per second needs to be achieved.

level 5 various images are displayed in succession. The test person needs to click on objects in the image quickly. During this time, the click speed and distribution are measured. This level is considered to have been completed successfully only if a minimum click speed of one click per second has been achieved for all the images and no more than 10% of the successive clicks were made at the same location.

Attentiontracking test: test sequence normally comprises a plurality of tests of different types, e.g. Attentiontracking tests and questionnaire pages. The questionnaire pages or other test types are not explained in more detail at this point, since they are not part of the invention.

Preloader: a Javascript which is used to download the entire test material from the Attentiontracking server 102 to the Attentiontracking client 103

Javascript client for still frames: in addition to the image material, a control file is loaded which specifies the order and display time for each image. The images are then shown accordingly in a full image window.

Javascript client for videos: the image material is played back using a standard browser component such as Windows Mediaplayer or a Java applet.

Event Recorder: all mouse clicks are captured in the form of events and are stored in the survey computer's main memory until the Attentiontracking test has been completed. Optionally, mouse movements can also be recorded by capturing these events as well. When the test has ended, all recorded data are sent to the Attentiontracking server by HTTP Mail.

Mouse 19: commercially available computer mouse. Optionally other pointer devices.

Screen 20: commercially available screen

Triggering the hyperlink for a test person starts the browser 118. The Attentiontracking server 102 transmits the click training and the test material to the client via the Internet connection.

During the training, the mouse behavior of the test person is checked to determine whether it is suitable for the test. The check is based on a measurement of the click speed and of the spatial distribution of the mouse click. Only if these parameters are in a predefined target corridor the click training successfully ended, and only then is the test material presented to the test person.

Presentation of the image material in the Attentiontracking test is controlled by a browser script which is likewise loaded by the server. The script is implemented in a browser, e. g. language Javascript. It preloads all the image material and then controls display thereof at precise times in the full screen mode of the screen 120.

During presentation of the image material, the Event Recorder, which is likewise implemented as a browser script, records all mouse and keyboard events. At the end of the test, the recorded data are sent to the Attentiontracking server 102.

The invention claimed is:

1. An apparatus for examination of images, comprising:
an image storage device configured to store image data for one or more images to be evaluated,
a display device configured to display the image data,
an input device for a subject configured to interrogate visualization data,
a control device which connects the image storage, display and input devices, and which controls a display of the images based on a sequence and timing provided in a control file,
a data matching device for matching image data and visualization data, and
an evaluation device,
wherein the input device comprises a pointing appliance configured be moved manually by a subject for pointing, and the input device is configured to interact with a marking such that the position of the pointing appliance is displayed by the marking on the display device,
wherein the control device further comprises an event detector configured to record position data transmitted from the input device when a specific event occurs and to create an event-based file formed by data records comprising data relating to time, position and image shown, the event detector further configured to create a data record including a reference time when an image change occurs, and
wherein the data matching device comprises a synchronization module which synchronizes the control file and the event-based file, upon which the evaluation device calculates a time-dependent visualization profile.

2. The apparatus as claimed in claim 1, wherein the pointing appliance is a computer mouse.

3. The apparatus as claimed in claim 1, wherein the pointing appliance is a light pointer or a light pen.

4. The apparatus as claimed in claim 1, 2 or 3, wherein two or more input devices with pointing appliances are provided.

5. The apparatus as claimed in claim 1, 2 or 3, further comprising an evaluation module that is physically separate from the input device the pointing appliances connected thereto via a data network.

6. The apparatus as claimed in claim 1, 2 or 3, wherein the specific event is the operation of a button on the pointing appliance.

7. The apparatus as claimed in claim 1, 2 or 3, wherein the specific event is the pointing appliance being at rest.

8. The apparatus as claimed in claim 1, 2 or 3, further comprising a conversion module for transformation of position data from an appliance-specific coordinate system to an appliance-independent coordinate system.

9. A method for examination of images, comprising:
storing image data for images to be examined in a memory device,
displaying the images based on a sequence and timing provided in a control file,
determining a position from data supplied from an input device by interrogating position data from a pointing appliance which is moved manually by a subject,
displaying interactively a marking for the position of the pointing appliance,
creating an event-based file formed by data records comprising data relating to time, position and image shown,
storing a data record in the event-based file when a specific event occurs,
storing another data record that includes a reference time when an image change occurs, and
evaluating by synchronizing the control file and the event-based file, upon which a time-dependent visualization profile is calculated.

10. The method as claimed in claim 9, wherein the event detector evaluates button operation on the pointing appliance.

11. The method as claimed in claim 9, wherein the event detector monitors the movements of the pointing appliance and is triggered when the pointing appliance comes to rest.

12. The method as claimed in claim 9, wherein a computer mouse is used as the pointing appliance.

13. The method as claimed in claim 9, wherein a light pointer or a light pen is used as the pointing appliance.

14. The method as claimed in claim 9, wherein the input device the pointing appliance transmit the position data via a data network to an evaluation module.

15. The apparatus as claimed in claim 5, wherein the data network is a LAN or a WAN.

16. The apparatus as claimed in claim 5, further comprising a conversion module for transformation of position data from an appliance-specific coordinate system to an appliance-independent coordinate system.

* * * * *

UNITED STATES PATENT AND TRADEMARK OFFICE
CERTIFICATE OF CORRECTION

| | | |
|---|---|---|
| PATENT NO. | : 7,512,289 B2 | Page 1 of 2 |
| APPLICATION NO. | : 10/716879 | |
| DATED | : March 31, 2009 | |
| INVENTOR(S) | : Christian Scheier et al. | |

It is certified that error appears in the above-identified patent and that said Letters Patent is hereby corrected as shown below:

<u>In the Specification:</u>

Column 2, line 29, please replace "necessary" with --necessarily--.

Column 4, line 51, please replace "is" with --was--.

Column 4, line 63, please replace "the Ethernet" with --Ethernet--.

Column 6, line 25, please replace "FIg." with --FIG.--.

Column 7, line 65, please replace "mage" with --image--.

Column 8, line 21, please replace "control device 24" with --control device 21--.

Column 9, line 17, please replace "appliance 24–" with --appliance 24,--.

Column 10, line 46, please replace "locked out" with --looked at--.

Column 13, line 34, please replace "FIG. 8" with --Fig. 5--.

<u>In the Claims:</u>

In Claim 5, column 22, line 36, please replace "the pointing appliances" with --pointing appliance--.

UNITED STATES PATENT AND TRADEMARK OFFICE
CERTIFICATE OF CORRECTION

PATENT NO.        : 7,512,289 B2
APPLICATION NO.   : 10/716879
DATED             : March 31, 2009
INVENTOR(S)       : Christian Scheier et al.

It is certified that error appears in the above-identified patent and that said Letters Patent is hereby corrected as shown below:

In Claim 14, column 24, line 2, please replace "the pointing appliance transmit" with --pointing appliance transmits--.

Signed and Sealed this

Fifteenth Day of September, 2009

David J. Kappos
*Director of the United States Patent and Trademark Office*